(12) United States Patent
Salles

(10) Patent No.: US 10,737,748 B2
(45) Date of Patent: Aug. 11, 2020

(54) DEVICE FOR LOADING OF BULK CARRIERS AND LOADING METHOD

(71) Applicant: VALE S.A., Rio de Janeiro (BR)

(72) Inventor: Adriano Cirino Salles, Serra (BR)

(73) Assignees: Vale S.A., Rio de Janeiro (BR); Adriano Cirino Salles, Serra (BR)

( * ) Notice: Subject to any disclaimer, the term of this patent is extended or adjusted under 35 U.S.C. 154(b) by 0 days.

(21) Appl. No.: 16/025,775

(22) Filed: Jul. 2, 2018

(65) Prior Publication Data

US 2019/0002059 A1    Jan. 3, 2019

(30) Foreign Application Priority Data

Jul. 3, 2017 (BR) .............................. 102017014425

(51) Int. Cl.
*B63B 27/28* (2006.01)
*B65G 69/00* (2006.01)
*B65G 67/60* (2006.01)

(52) U.S. Cl.
CPC ............ *B63B 27/28* (2013.01); *B65G 67/606* (2013.01); *B65G 69/00* (2013.01)

(58) Field of Classification Search
CPC ....... B63B 27/28; B63B 17/023; B63B 19/12; B63B 19/14; B63B 17/02; B63B 27/00; B63B 25/02; B65G 67/606; B65G 69/00
USPC ........................................ 414/137.4; 141/337
See application file for complete search history.

(56) References Cited

U.S. PATENT DOCUMENTS

| | | | | | |
|---|---|---|---|---|---|
| 2,301,617 | A | * | 11/1942 | Cox ....................... | B65G 53/42 406/152 |
| 3,195,943 | A | * | 7/1965 | Taylor ................... | B63B 17/023 135/90 |
| 4,361,079 | A | * | 11/1982 | Christensen .............. | E21F 1/04 138/120 |
| 4,897,012 | A | * | 1/1990 | Brewer ................ | B65G 47/962 187/407 |
| 5,322,393 | A | * | 6/1994 | Lundquist ............ | B65G 67/606 406/151 |
| 5,470,191 | A | * | 11/1995 | Aalst ...................... | B65G 53/24 141/67 |
| 6,058,557 | A | * | 5/2000 | Berndt ............... | B01D 46/0068 15/314 |
| 2010/0326007 | A1 | * | 12/2010 | Silber ..................... | E04G 21/12 52/741.4 |
| 2014/0311584 | A1 | * | 10/2014 | Longueve ............... | B63B 27/24 137/15.16 |

FOREIGN PATENT DOCUMENTS

EP           0002377 A1     6/1979
WO   WO 2014/167417 A2    10/2014

* cited by examiner

*Primary Examiner* — Lynn E Schwenning
(74) *Attorney, Agent, or Firm* — Arent Fox LLP

(57) ABSTRACT

This disclosure refers to a device for assisting in the loading of bulk carriers even in rainy weather. Such device comprises: a smooth hose configured to be inserted into the opening of the hatch of the storage hold cover of the ship; a folding hose placed above the smooth hose and configured to absorb the movements of the bulk carrier relative to the device; an upper flange for fastening the device to the free end of the nozzle of the ship loader; and a lower flange configured to connect the device to the hatch opening of the storage hold cover of the ship. The disclosure also includes a method of loading bulk carriers using the device.

14 Claims, 3 Drawing Sheets

DEVICE FOR LOADING OF BULK CARRIERS AND LOADING METHOD

CROSS REFERENCE TO RELATED APPLICATION

This application claims priority to BR Application No. 102017014425-9 filed Jul. 3, 2017, the disclosure of which is hereby incorporated by reference in its entirety.

BACKGROUND

This invention comprises a device for loading bulk carriers as well as a method of loading ships using the device of this invention.

The ship loading operation is an operation of extreme importance for the transport of various materials, in situ bulk materials. Bulk material can vary in various types of material such as ore, fertilizers and food, thus being a very common operation in many types of industry.

The loading of VLOCs is carried out by means of equipment known as a ship loader, which basically consists of a movable base, a boom, and a cargo discharge nozzle.

The mobile base consists of a structure associated with rails arranged on the dock, allowing the equipment to travel under these rails by means of a travel system. In addition, the movable base also allows a rotational movement of its boom by means of a rotation system. There are also ship loaders with fixed base, realizing the movement only of the boom, that is, not traveling in rails.

The boom consists of a structure fixed to the movable base, thus allowing the ship loader to reach the ship to be loaded. It has a conveyor belt inside, allowing to transport bulk material from the moving base to the cargo discharge nozzle.

The cargo discharge nozzle consists of a tubular structure where the material is discharged from the conveyor belt and directed to the storage holds of the ships being loaded.

Ships to be loaded, in this case, cargo ships for bulk material, have a storage hold where cargo is stored during transportation. These storage holds must necessarily be closed to prevent bad weather from contaminating the material inside. If there is contact of the material with water, which occurs mainly in the case of food grains and fertilizers, the material will be damaged.

There are several types and models of covers for storage holds of VLOCs, the most common of which are rolling and folded type. In the rolling type, the covers are pushed and traveled to perform the opening of the storage hold, while in the folded type the covers are folded to form a concertina and, thus, open the storage hold.

Thus, in the prior art, in order to carry out the loading of the VLOC, it is necessary to open those covers to allow the access of the ship loader nozzle to the interior of the storage hold, leaving the material already in storage inside the storage basement and which is being loaded damagingly exposed to local weather.

When there is a forecast of rainfall or effectively rainy weather and therefore high winds, ship loading must be interrupted due to the exposure necessarily caused by the opening of the storage hold covers, obviously not being able to load the material to the ship with the covers closed.

Therefore, a device enabling VLOCs to be loaded by ship loaders even in rainy weather and high winds is of utmost importance and interest.

In the prior art, there are some patent documents which disclose equipment and devices to assist in loading ships even in rainy weathers.

Document EP0002377A1 discloses a device for loading VLOCs, reducing the emission of dust and allowing the loading to be carried out even in the rain. Such a device consists of a transfer pipeline provided with a waterproofing cover, and this pipeline is arranged to pass through a protection of the cargo hold in order to prevent rain from entering and the emission of dust.

The device of document EP0002377A1 comprises a folding cover, a transfer pipeline, a ring, and a protection. The protection consists of flexible protection or any other type of protection configured to prevent water or contaminants from entering the cargo hold of the ship.

The transfer pipeline passes through such protection so that the material to be loaded into the ship passes through it and is dumped into the cargo hold. Such a transfer pipeline is composed of a folding cover configured to guarantee the protection of the pipeline from possible contamination by rainwater and allow a small movement of the pipeline without damaging it.

The aforementioned folding cover has a ring at its end, which is used to associate the protection to the pipeline cover. In this way, the ring, together with the cover and the protection, prevents the water from entering the pipeline or the cargo hold of the ship.

However, the device of document EP0002377A1 requires a protective cover to be attached to the opening of the storage hold, requiring a long operating time and a high cost of making such a cover due to the size of the hold opening, which is approximately 400 m$^2$.

In addition, in rainy weather and high winds, it is extremely difficult to install this protective cover, requiring other equipment to carry out the positioning and placing workers at risk to carry out their fixation.

Another document of the prior art is WO2014167417A2, which discloses a device for performing the loading of VLOCs in rainy weathers. Such device consists of a cargo hold cover formed by movable panels, one of said panels being provided with a hole for insertion of a pipeline for discharging/loading of material.

The device of WO2014167417A2 comprises a plurality of panels, a central panel, an opening, and wheels. The panels are overlapped so that they can move between them, thus forming the cargo hold cover of the ship. Such panels are associated by flanges at their ends, which guarantee the cover seal, preventing the entry of water or impurities.

The central panel is different from the other panels, as it contains a passing opening arranged in its structure. Such opening is configured to allow a bulk material feed pipeline to be introduced therein, and to discharge material into the cargo hold of the ship, thereby performing its loading.

The bulk material pipeline is provided with a cover, which prevents water from entering the opening of the panel while loading of material. The wheels are arranged in the end panels, allowing the entire cover to be moved easily.

However, document WO2014167417A2 also requires a structure to be installed in the storage hold of the ship to prevent contamination of the material therein or being loaded, thereby causing a large time to carry out the installation of such a structure.

In addition, the installation of this structure occurs with extreme difficulty in rainy weather with strong winds, necessitating other equipment items to perform both the positioning and the installation of this structure in the storage hold of the ship.

Nevertheless, the devices proposed by prior art patent documents, in the event of collapse of their structures, cause damage to the cargo due to contamination with the water disposed in the ruptured structure and the physical contamination of the cargo with the shrapnel of the structure. Another disadvantage of prior art documents is that with none of them it is possible to realize their use irrespective of the type of opening of the cover of the cargo hold, either rolling or folding, each structure being specific for each type of opening of the cover of the hold.

Therefore, there is no device in the prior art for loading VLOCs in rainy weather with compact structure and low manufacturing cost.

Additionally, there is no device in the prior art for loading VLOCs in rainy weather that does not require a robust structure to be attached to protect the material inside the storage hold of ships.

SUMMARY

An aspect of this invention may include a device for loading bulk carriers (VLOCs) by means of ship loaders, having a compact structure and low cost of manufacture.

An aspect of this invention may include a device for loading VLOCs by means of ship loaders which do not require a robust structure to protect the material inside the storage hold of ships.

of this invention may include a method for loading VLOCs using the device for ship loading, which can perform the loading of ships in a fast, practical, and safe way.

According to the precepts of a preferred mode of this invention, it is described here a device for loading bulk carriers (VLOCs) by means of ship loaders comprising a nozzle. Such device is attached to the free end of the nozzle and comprises: a smooth hose of a slightly conical tubular structure configured to allow the passage of material therein; a flexibly shaped folding hose similar to a concertina arranged linearly above the smooth hose; an upper flange secured to the upper end of the folding hose; and a lower flange disposed at the upper end of the smooth hose and at the lower end of the folding hose, i.e. at the end opposite the upper flange. The attachment of the device to the nozzle of the ship loader is accomplished by means of the upper flange.

It is important to note that the lower flange is configured to allow the connection of the device with a hatch opening of the storage hold cover of the VLOC. The smooth hose is configured to enter the hatch opening of the storage hold cover of the VLOC and allow a flow of material to pass therethrough towards the storage hold. The folding hose is configured to absorb the movements performed by the VLOC relative to the device.

The upper flange is attached to the nozzle of the ship loader by means of fastening devices, for example, fastening screws, and the lower flange is connected to the hatch opening of the cargo hold cover hatch of the VLOC by means of a socket.

The preferred embodiment of the present invention also relates to a method of loading bulk carriers, comprising the steps of: securing the device to the free end of the ship loader's nozzle by the upper flange; positioning the ship loader, positioning the nozzle above the hatch opening of the storage hold over of the VLOC; positioning and connecting the device with the opening hatch of the storage hold cover of the VLOC; loading the bulk material into the storage hold of the ship by means of the device; and dissociating the device with the opening hatch of the storage hold cover of the VLOC.

The step of positioning the device consists of inserting the smooth hose into the hatch opening of the storage hold cover and the attachment consists of fitting the lower flange with the hatch opening of the storage hold cover.

After attaching the device to the free end of the nozzle of the ship loader via the upper flange, all other steps are repeated until all the storage holds of the VLOCs are loaded.

BRIEF DESCRIPTION OF THE FIGURES

This invention is more described in detail, based on its figures.

DETAILED DESCRIPTION

The subject matter of this invention will be detailed hereinafter by way of example and not limiting, since both the materials and methods per se disclosed herein may comprise different details and procedures without departing from the scope of the invention, which will be defined in the claims.

Figure 1:
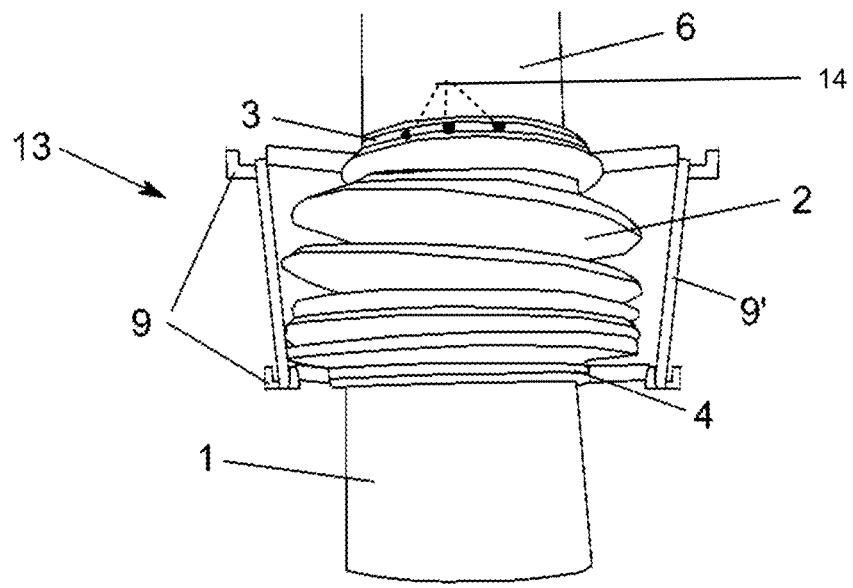
FIG. 1 is a front view of the preferred layout of the ship loader device.
Figure 4:
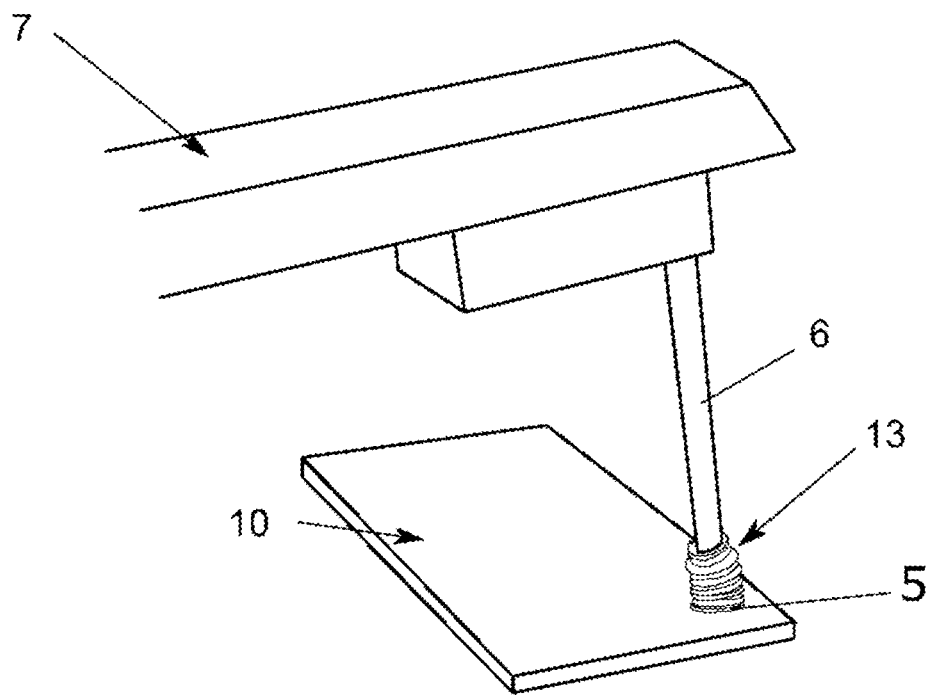
FIG. 4 is a perspective view of the ship loading by using the ship loader device.
Figure 5:
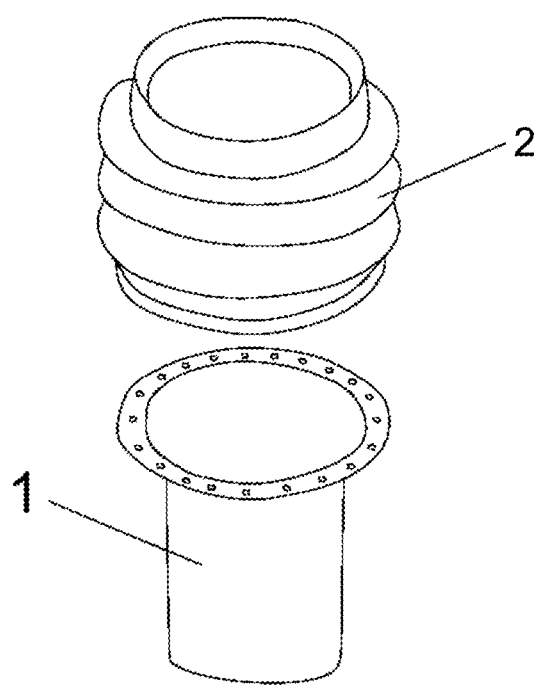
FIG. 5 is an exploded perspective view of the smooth and folding hose of the ship loader device.

In a preferred mode of this invention, FIG. 1 illustrates a device 13 for loading bulk carriers (VLOCs) by means of a ship loader 7 (FIG. 4). Such device 13 is attached to the end of the nozzle 6 of the ship loader 7, allowing its installation and removal when necessary, and may be employed in rainy or non-rainy weather.

Figure 2:
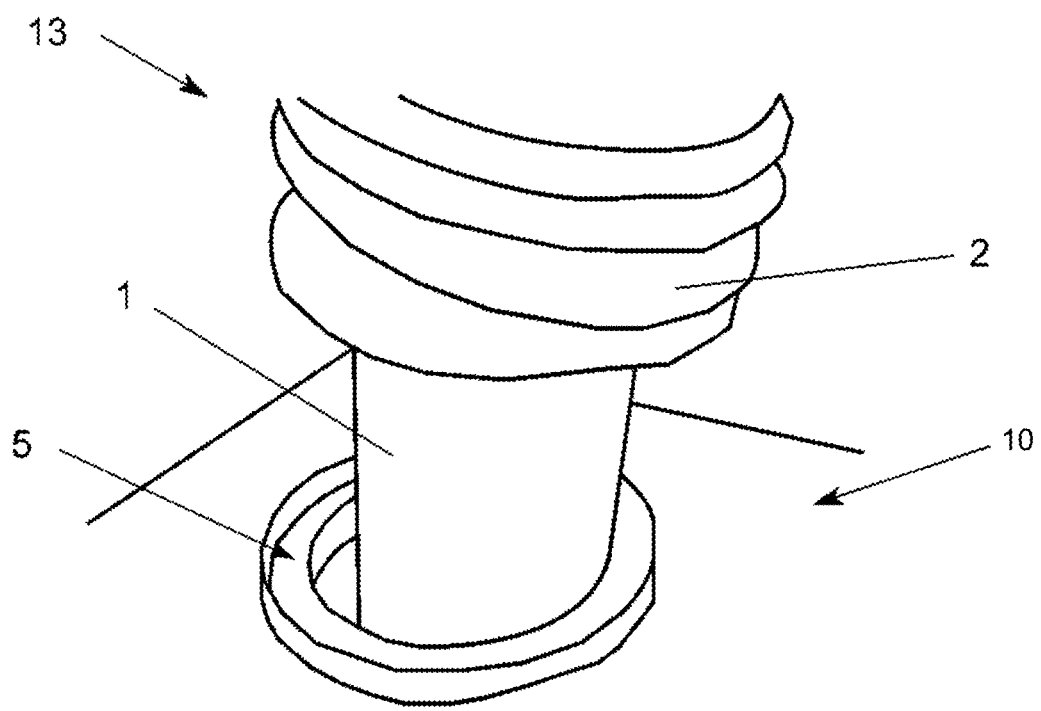
FIG. 2 is a perspective view of the ship loader device being positioned on the hatch.

As it can be seen from FIG. 2, the device 13 allows loading of the ship by means of its association with the hatch 5 of the storage hold cover 10 of the ship, avoiding the use of heavy and sturdy structures to protect of the material inside the hold.

The hatch 5 of the storage hold cover 10 consists of a small opening arranged in the hold covers 10, allowing opening or closing when necessary to access the hold without it being necessary to open completely the covers 10.

Figure 3:
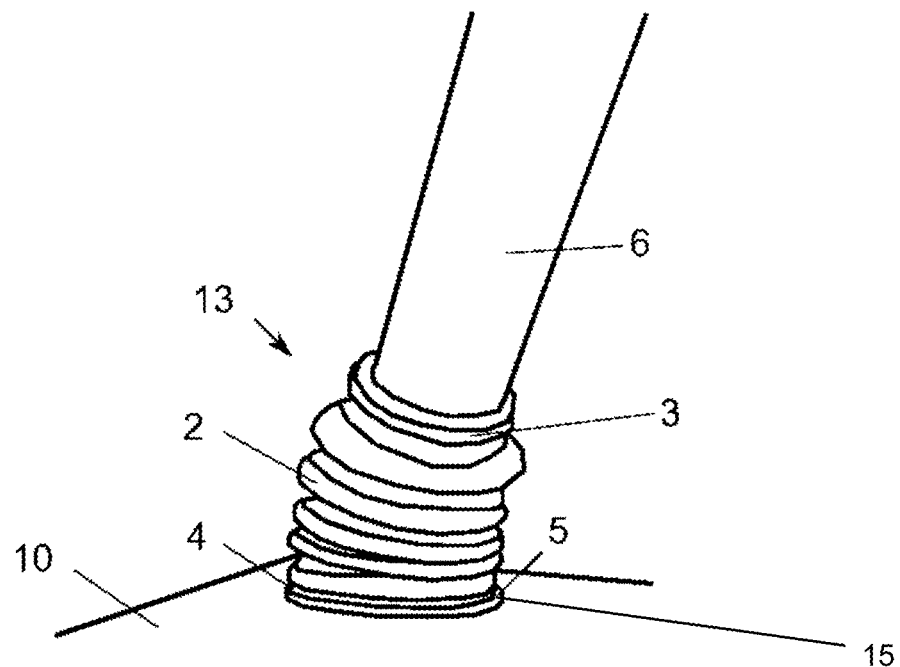
FIG. 3 is a perspective view of the ship loader device attached to the hatch.

Therefore, it can be seen in FIG. 3 that, in order to carry out the loading of the VLOC, the device 13, fixed to the nozzle 6 of the ship loader 7, is associated with the opening of the hatch 5 of the cargo hold cover 10, sealing the hatch 5 opening and allowing the material to be discharged into the storage hold without contact with rainwater or other contaminants.

The ship loading device 13 preferably comprises a smooth hose 1, a folding hose 2, an upper flange 3, and a lower flange 4, as shown in FIG. 1.

The smooth hose 1 consists of a slightly conical tubular structure, with a transverse section similar to the opening of the hatch 5, configured to ensure and allow the flow of bulk material to be discharged by the device 13 during loading. FIG. 2 shows the smooth hose 1 entering the hatch 5 and, in FIGS. 3 and 4, it is possible to visualize said smooth hose 1 already introduced in the hatch 5, and the lower flange 4 sealing the opening. In this way, the flow of material is not interrupted or changed as the material exits the nozzle 6 of ship loader 7, enters the device 13, and is discharged into the hold of the VLOC.

The smooth hose manufacturing material 1 is preferably a natural rubber, reinforced with nylon layers and resistant to abrasion and impact, suitable for applications with abrasive and/or corrosive fluids. However, other types of materials or rubbers may be used for making the smooth hose 1, being only essential that it cannot be damaged by the flow of abrasive bulk material therein, nor does it interfere with the flow of material while loading.

In its preferred mode, the smooth hose 1 has a diameter equal to the diameter of the nozzle 6 of the ship loader 7. The hose 1 may be changed when necessary, i.e. when the ship to be docked has hatch 5 diameter of the cargo hold cover 10 smaller than the nozzle diameter or if it is damaged. This exchange is carried out by means of quick coupling device in an easy and agile way. Each smooth hose 1 has different diameters to suit a wider range of ships since there is no standardization of hatch size.

The smooth hose 1 has a diameter at its upper end equal to the diameter of the folding hose 2. The diameter of its lower end is smaller, being slightly conical, as previously said. This slightly conical shape of the smooth hose 1 makes it possible to fit into the opening of the hatch 5. When it is necessary to use the smooth hose 1 with a small diameter, it is necessary to reduce the flow of material so that it does not get clogged.

The folding hose 2 is flexible and has a concertina-like shape, being fixed linearly to the upper end of the smooth hose 1 and arranged above the latter. The fastening of the folding hose 2 with the smooth hose 1 is preferably accomplished by means of quick-release tabs, allowing easy replacement thereof when necessary.

The importance of the folding hose 2, and the differential which makes the invention feasible, is the absorption of ship movements, caused due to tidal variation, and movements of the ship loader 7, without transmitting the efforts for such equipment or to the ship, ensuring the structural integrity of these, and still allowing the product to flow. Therefore, the folding hose 2 has the function of absorbing and softening small movements, preventing them from damaging the equipment involved in the operation, i.e. the device 13, the hatch 5, and the nozzle 6 of the ship loader 7.

The material used to manufacture the folding hose 2 is preferably made of natural rubber (inner part) and synthetic rubber (outer part), reinforced with nylon layers and resistant to abrasion and impact. This material is suitable for applications with abrasive and/or corrosive fluids, having special characteristics regarding hardness, tensile strength, rupture strength, tear strength, specific gravity, resilience, and working temperature in accordance with ABNT EB 362 of 1974 (Classification system of vulcanized elastomeric materials for general applications).

The folding hose 2 is preferably manufactured from a specially developed mandrel so as to impart to the folding hose 2 the final shape with the suitably integrated compounds.

The folding hose 2 and the smooth hose 1 have been developed and manufactured specifically for this invention, the development of which type of material is used, so as to be flexible enough to absorb the aforementioned movements and efforts, in addition to rigid enough to withstand the flow of material (3,000 tons/hour) without bending and choking the flow. The material of the hoses 1 and 2 is also resistant to the abrasiveness and shear generated by the friction of the product in the wall of the hoses 1 and 2.

Ratchets 9 are activated for compression of the folding hose 2 during conventional ship loading operation, i.e. when the hold cover is fully open in non-rainy weather. In this loading mode, the nozzle 6 and the ship loader 7 are permanently in movement for stowage of the cargo inside the hold. Therefore, if the folding hose 2 is not compressed by the ratchets, it can move freely and eventually cause the flow to be choked.

Such ratchets 9 are arranged at the upper and lower ends of the folding hose 2 and are joined by means of a tape 9' which is to force a ratchet 9 against the other for the compression of the folding hose 2.

The upper flange 3 preferably consists of a flange configured to attach the folding hose 2 with the end of the nozzle 6 of the ship loader 7. Such attachment allows the material to continue its flow from the nozzle 6 of the ship loader 7 to the device without any obstruction or interference.

Such upper flange 3 can be adjusted or replaced according to the ship loader 7 models in which it is being used, thus adapting to all types and models of nozzles 6.

The fastening of the upper flange 3 to the end of the nozzle 6 of the ship loader 7 can be carried out by means of screws (14), fittings, or even welding. In its preferred configuration, the upper flange 3 is secured to the end of the nozzle 6 by means of screws (14), thus allowing its removal when it needs to be maintained.

The lower flange 4 consists of a flange configured to attach the folding hose 2 with the opening of the hatch 5, as shown in FIG. 3. The lower flange 4 is attached to the lower end of the folding hose 2 and consequently to the upper end of the smooth hose 1, causing the smooth hose 1 to pass through the lower flange 4.

Therefore, by positioning the device 13, the lower flange 4 is connected to the opening of the hatch 5, allowing the smooth hose 1 to be inserted for ship loading, and the opening of the hatch 5 to be sealed.

The connection of the lower flange 4 to the hatch 5 of the storage hold cover 10 may be accomplished by means of screws or a fitting (15) between the lower flange 4 and the hatch 5. In its preferred configuration, the lower flange 4 is only engaged with the opening of the hatch 5, allowing it to be easily associated and dissociated therefrom.

The material for making the flanges, i.e. the upper flange 3 and the lower flange 4, may be any a metal or polymer alloy material which is resistant to the weather of the port, such as rain, sea water, salt spray, dust, and others. The material of the preferred configuration of the upper and lower flanges 4 consists of stainless steel, able to withstand such weathering.

With the use of the device 13 for loading VLOCs, it is possible to load the ship without it being necessary to open the storage hold covers 10, introducing the device 13 only into the opening of the hatch 5 to discharge the material inside the basement.

Thus, it is not necessary to use sturdy structures to perform the protection of the material disposed inside the storage hold, since the hold cover 10 does not need to be opened to carry out the ship loading.

This invention also consists of a method for loading very bulk carriers that uses the device 13 described above. The ship loading process comprises five steps, these being described in detail below.

The first step consists in securing the device 13 to the end of the nozzle 6 of the ship loader 7, this step being carried out by the association of the upper flange 3 with the end of the nozzle 6 by means of fastening devices, for example, screws. It should be noted that this first step is only carried out once, and it is not necessary to remove the device 13 at each loading performed by the same nozzle 6.

The second step consists in positioning the ship loader 7, mainly of the nozzle 6, positioning it above the hatch 5 of the storage hold cover 10 of the ship to be loaded. In this step, the positioning of the nozzle 6 can be accomplished by both the mobile base travel system (when it is not a fixed base ship loader 7) and by the boom rotation system, ensuring precise positioning.

The third step consists in the positioning and fastening of the device 13 to the hatch 5 of the storage hold cover of the ship. This positioning consists of introducing the smooth hose 1 into the opening of the hatch 5, allowing it to have access to the storage hold.

The fixation of the device 13 is carried out by means of the lower flange 4, which is associated with the hatch 5 of the storage hold cover 10 by means of a locking or fixing screws, allowing the smooth hose 1 not to leave the interior of the hatch 5 during loading.

The fourth step consists of loading bulk material through the device 13. In this step, with the device 13 already positioned and secured, material is then discharged into the nozzle 6 of the ship loader 7, with material passing through the entire length of the nozzle 6 until it reaches the device 13.

Upon reaching the device 13, the bulk material discharged into the nozzle 6 passes through the folding hose 2, thereafter by the smooth hose 1, without interruptions or interference in the flow, and is then dumped into the storage hold, until this hold is duly filled and thus completing the fourth step.

During the fourth step, since the ship is at sea, it is possible that it moves relative to the ship loader 7 according to the waves. Such movements will be suitably absorbed by the folding hose 2 so as to avoid excessive stresses in the nozzle 6 or the hatch 5 of the storage hold cover 10.

The fifth step is only started when the storage hold being loaded is already filled with the bulk material, i.e. when the loading has been completed. The loading in rainy weather is performed partially due to the material flow angle, and the trimming step is required to complete the loading of the hold. The trimming step is performed later, according to conventional operating procedure and with stable weather.

Thus, with the loading already completed, the device 13 is then disassociated from the hatch 5, allowing it to be moved again to load other cargo holds or allowing the ship to finally be able to follow the journey to carry the loaded material.

Dissociation of the device 13 is carried out by means of the lower flange 4 which has been associated with the hatch 5 in the third step. Thus, if the lower flange 4 has been fixed to the hatch 5 by means of a fitting, it will only be undocked. In another situation, if the lower flange 4 has been secured by screws, the screws are withdrawn to remove the device 13.

The steps, except the first, are then repeated until all storage holds of the ships are loaded using the ship loading device 13. Each hold generally has two hatches 5 located on opposite sides, arranged diagonally, and the loading is carried through the two hatches, at different times, so that the distribution of the cargo occurs, and the listing of ship is avoided.

Therefore, it is concluded that both the device 13 and the method of ship loading achieve the intended purposes, so that both make it possible to carry out loading operations for VLOCs even in bad weather, thus avoiding contamination of the material being loaded and the material already inside the storage hold.

In addition, this method does not require any type of robust structure to carry out the ships loading, requiring only the use of the device 13 associated with the hatch 5 of the hold cover 10, significantly reducing the loading time and the cost of equipment.

The invention claimed is:

1. A device for loading of bulk carriers through ship loaders which comprise a nozzle, wherein the device is attached to a free end of the nozzle and comprises:
   a smooth hose of a conical tubular structure configured to allow the passage of material therein, wherein the smooth hose is configured to enter an opening of a hatch of a storage hold of the bulk carrier;
   a flexibly shaped folding hose arranged linearly above and connected to the smooth hose;
   an upper flange secured to an upper end of the folding hose; and
   a lower flange attached to a lower end of the folding hose, located at the end opposite the upper flange.

2. The device for loading bulk carriers according to claim 1, wherein the upper flange is configured to fasten the device with the nozzle of the ship loader.

3. The device for loading bulk carriers according to claim 2, wherein the upper flange is attached to the nozzle of the ship loader by fixing screws.

4. The device for loading bulk carriers according to claim 1, wherein the lower flange is configured to allow the connection of the device with an opening of a hatch of a storage hold cover of the bulk carrier.

5. The device for loading bulk carriers according to claim 4, wherein the lower flange is connected to the opening of the hatch of the storage hold cover of the bulk carrier by a fitting, making this opening capable of being sealed.

6. The device for loading bulk carriers according to claim 5, wherein the lower flange is also attached to the upper end of the smooth hose, causing the smooth hose to pass through the lower flange.

7. The device for loading bulk carriers according to claim 4, wherein the lower flange is also attached to an upper end of the smooth hose, causing the smooth hose to pass through the lower flange.

8. The device for loading bulk carriers according to claim 1, wherein the diameter of the lower end of the smooth hose varies according to the diameter of the hatch in which it will be introduced.

9. The device for loading bulk carriers according to claim 1, wherein the smooth hose is resistant to abrasiveness and shearing generated in a hose wall by friction of the material to be discharged.

10. The device for loading bulk carriers according to claim 1, wherein the folding hose is resistant to abrasiveness and shearing generated in a hose wall by friction of the material to be discharged, and is flexible enough to absorb small movements of the ship, preventing them from damaging the device and the nozzle of the ship loader, in addition to being rigid enough to support the material flow without folding or choking the flow.

11. The device for loading bulk carriers according to claim 1, further comprising ratchets arranged in the upper and lower end of the folding hose, associated by a tape, configured to compress the folding hose when a hold cover is fully open.

12. A method of loading of bulk carriers, comprising:
attaching the device of claim 1 to the free end of a nozzle of a ship loader through an upper flange;
positioning the ship loader, placing the nozzle above an opened hatch of a storage hold cover of a bulk carrier;
positioning and attaching the device to an opened hatch of the storage hold of the bulk carrier;
loading bulk material into the storage hold of the bulk carrier through the device; and
dissociating the device from the opening of the hatch of the storage hold of the bulk carrier.

13. The method of loading of bulk carriers, according to claim 12, wherein the positioning the device comprises inserting the smooth hose into the hatch opening of the storage hold cover and the attaching comprises fitting the lower flange with the hatch opening of the storage hold cover.

14. The method of loading of bulk carriers, according to claim 12, wherein the positioning the ship loader, positioning and attaching the device, loading of the bulk material, and dissociating the device are repeated until all storage holds of the bulk carriers are loaded.

* * * * *